No. 737,581. PATENTED SEPT. 1, 1903.
W. H. CHAPMAN.
FLOWER POT STAND.
APPLICATION FILED OCT. 13, 1902.
NO MODEL.

Witnesses:—
Benjamin Black.
Charles H. Briggs.

Inventor:—
William Henry Chapman.
per:— Z. Eaton.
His Attorney.

No. 737,581.                                              Patented September 1, 1903.

UNITED STATES PATENT OFFICE.

WILLIAM HENRY CHAPMAN, OF BANBURY, ENGLAND.

FLOWER-POT STAND.

SPECIFICATION forming part of Letters Patent No. 737,581, dated September 1, 1903.

Application filed October 13, 1902. Serial No. 127,119. (No model.)

*To all whom it may concern:*

Be it known that I, WILLIAM HENRY CHAPMAN, a subject of the King of Great Britain, and a resident of Banbury, in the county of Oxford, England, have invented certain new and useful Improvements in Flower-Pot Stands, (for which I have applied for a patent in Great Britain, No. 7,445, dated March 27, 1902,) of which the following is a full, clear, and exact specification.

This invention relates to an improved flower-pot support, and is for use especially in cases where the flower-pot is inserted in an art pot or vase, the object being to raise the flower-pot so that the bottom thereof is not immersed or in contact with the water drained therefrom, which remains in the bottom of the art pot or vase.

Figure 1:
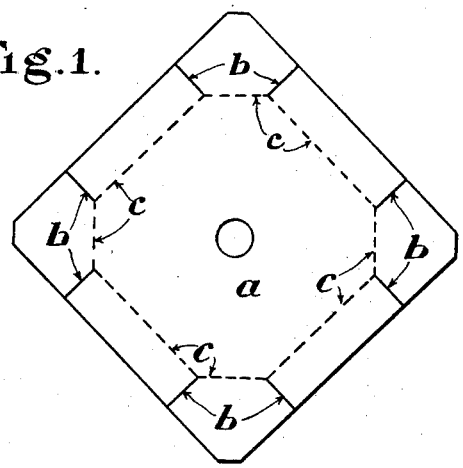
Figure 2:
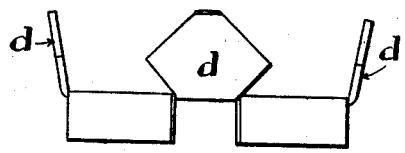

Referring to the annexed drawings, Figure 1 is a plan view of the blank from which my invention is formed; Fig. 2, a side elevation of my invention, Fig. 3 a plan view.

Figure 3:
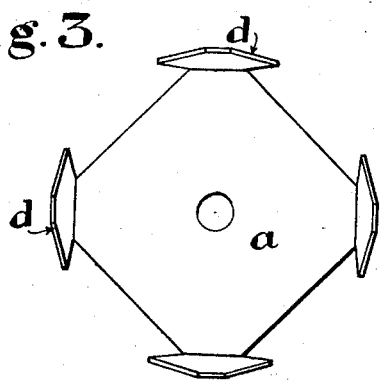

The piece of metal $a$ or other suitable material is cut along the lines $b$ and bent along the dotted lines $c$ so as to form the shape shown in Figs. 2 and 3. This is inserted at the bottom of the art-pot, the flower-pot resting thereon and being kept in a raised position by the turned-up corners $d$.

If desired, the shape shown in Fig. 3 may be molded in earthenware or the like material.

Having thus described my invention, what I claim, and desire to secure by Letters Patent, is—

A flower-pot stand comprising a square base-piece having a central perforation therein, pieces projecting upwardly from the corners of the piece, legs or supports formed by a downwardly-projecting piece from each side thereof, substantially as described herein and for the purpose set forth.

In testimony that I claim the foregoing I have hereunto set my hand this 27th day of August, 1902.

WILLIAM HENRY CHAPMAN.

Witnesses:
  BENJAMIN CLARK,
  HENRY DENIS HOSKINS.